T. A. EDISON.
ALTERNATING CURRENT RECTIFYING SYSTEM.
APPLICATION FILED JUNE 13, 1912.

1,152,615.

Patented Sept. 7, 1915.
2 SHEETS—SHEET 2.

Witnesses:
Frank O Lewis
Henry Lanahan

Inventor:
Thomas A. Edison
Frank L. Dyer
his Atty.

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

ALTERNATING-CURRENT-RECTIFYING SYSTEM.

1,152,615.      Specification of Letters Patent.      Patented Sept. 7, 1915.

Application filed June 13, 1912. Serial No. 703,367.

*To all whom it may concern:*

Be it known that I, THOMAS A. EDISON, a citizen of the United States, and a resident of Llewellyn Park, West Orange, Essex county, New Jersey, have invented certain new and useful Improvements in Alternating-Current-Rectifying Systems, of which the following is a description.

My invention relates to alternating current rectifying systems, and particularly to systems of the class in which a plurality of rectifying circuits connected in parallel are provided.

In some aspects my invention is an improvement in alternating current rectifying systems, in which a plurality of groups of rectifying devices are connected in parallel, the rectifying devices of each group being connected in series. In such systems it may happen that a rectifying device of one or more of the groups becomes inoperative, or that one or more of the groups carries less than their share of the load, and in such cases the remaining groups are liable to be overloaded.

The principal object of my invention is to obviate all liability to such overloading.

Other objects of my invention appear in the further description thereof in which reference is had to the drawings accompanying and forming part of this specification, and in which—

Figure 1:
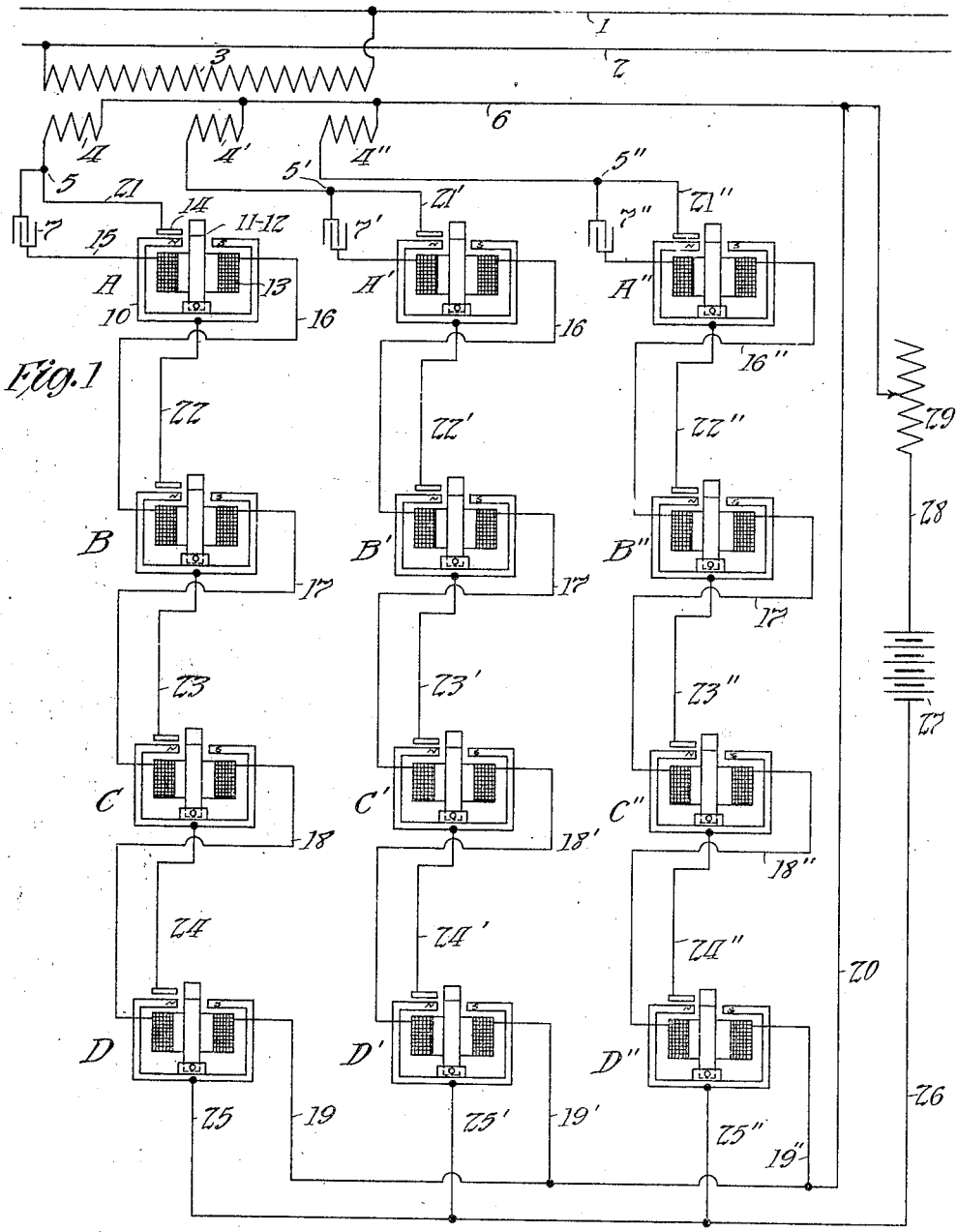
Figure 2:
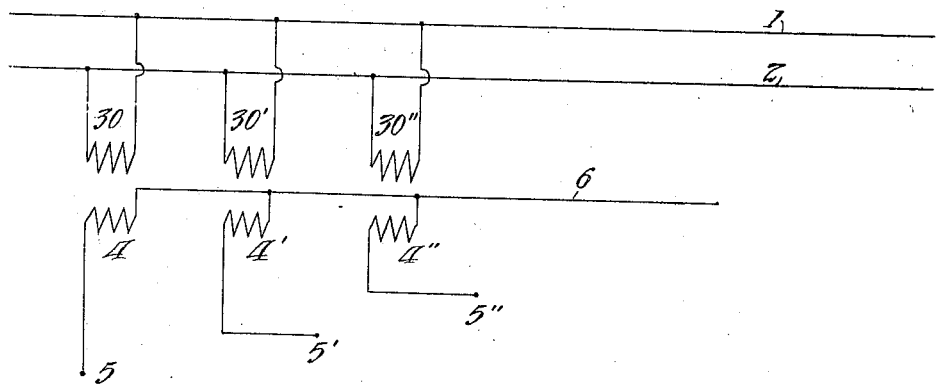

Figure 1 is a diagrammatic view of a rectifying system embodying my invention; Fig. 2 is a diagrammatic view of a modification of a portion of the system illustrated in Fig. 1; and Fig. 3 is a vertical sectional view of a simplified form of a rectifying device, such as I prefer to use in my improved system.

Figure 3:
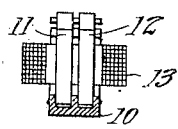

Referring to the drawings, and particularly to Figs. 1 and 3, at 1 and 2 are shown alternating current mains connected to any suitable source of alternating current. Across the mains 1 and 2 the primary 3 of a transformer is connected. The transformer is provided with a plurality of secondary windings 4, 4', 4''. One terminal of each of the secondary windings 4, 4', 4'' is connected to a common conducting lead 6. The other terminal of each of the secondary windings 4, 4', 4'' is connected to a group of rectifying devices, there being one such group for each of the secondary windings. These terminals are designated 5, 5', 5'', the said terminals belonging to the said secondary windings 4, 4', 4'' respectively. The group of rectifying devices connected to the terminal 5 of the winding 4 comprises rectifying devices A, B, C and D, the group connected to the terminal 5' of the winding 4' comprises devices A', B', C' and D', and the group connected to the terminal 5'' comprises the devices A'', B'', C'' and D''. Each of these rectifying devices consists of a permanent magnet 10 having an almost closed magnetic circuit, and in the gap of the magnet a plurality of soft iron armatures 11 and 12 are mounted so as to be free to vibrate, said armatures being pivoted at their lower ends to the permanent magnet or to a suitable frame supporting the magnet. Each of the armatures is provided at its upper end with a contact, preferably of carbon, the contacts being adapted to coöperate with a stationary contact 14. The armatures 11 and 12 are surrounded by an actuating coil 13. The rectifying devices of the first group are connected as follows: The actuating coils are connected in series with each other and with the secondary winding 4 by conductor 15 leading from the terminal 5 of the secondary winding 4 to the left hand terminal of the actuating coil of the rectifying device A, conductor 16 leading from the right hand terminal of the actuating coil of the rectifying device A to the left hand terminal of the actuating coil of the rectifying device B, conductor 17 leading from the right hand terminal of the actuating coil of the rectifying device B to the left hand terminal of the actuating coil of the rectifying device C, conductor 18 leading from the right hand terminal of the actuating coil of the rectifying device C to the left hand terminal of the actuating coil of the rectifying device D, and conductor 19 leading from the right hand terminal of the actuating coil of the rectifying device D to a common return conductor 20, leading to the conductor 6. In the circuit containing the actuating coils, as for example, in the conductor 15, an adjustable condenser 7 is connected for a purpose hereinafter described.

The rectifying circuits of the first group of rectifying devices are connected as follows:—The terminal 5 of the secondary winding 4 is connected by conductor 21 to the stationary contact 14 of rectifying device A; the vibrating contacts and armatures of rectifying device A are connected through the permanent magnet 10 or the frame by a conductor 22 to the stationary contact of the rectifying device B; the vibrating contacts and armatures of the rectifying device B are connected through the permanent magnet or frame by a conductor 23 to the stationary contact of the rectifying device C; the vibrating contacts and armatures of the rectifying device C are connected through the permanent magnet or the frame by the conductor 24 to the stationary contact of the rectifying device D; the vibrating contacts and armatures of the rectifying device D are connected through the magnet or the frame by a conductor 25 to a conductor 26 leading to a direct current translating device, such as the storage battery 27, to which uni-directional current is to be supplied. The other terminal of the storage battery is connected by conductor 28 and through an adjustable rheostat 29 to the common conducting lead 6. A second group of rectifying devices A', B', C' and D' is connected to the terminal 5' of the secondary winding 4' in the same manner as the group A, B, C, D, the primed reference characters designating parts corresponding to those designated by the unprimed reference characters associated with the first group of rectifying devices. A third group of rectifying devices A'', B'', C'' and D'', similar to those hereinbefore described, is connected to the terminal 5'' of the secondary winding 4'' in the same manner as the first group, the double primed reference characters designating parts corresponding to those designated by the unprimed reference characters of the first group.

It will be observed that I have described a rectifying system including three groups of rectifying devices, each group including four such devices, the actuating circuits of the devices of each group being connected in series with each other and with an adjustable condenser and a secondary winding of the transformer, and the rectifying circuits of each group being connected in series with each other and with a secondary winding of the transformer, the serially connected secondary windings and groups being connected in parallel with each other and in series with the direct current translating device.

The normal operation of the system is as follows:—Alternations of current occur simultaneously in all of the actuating coils, making of the upper ends of the armatures north and south poles alternately. Furthermore, when the upper ends of the armatures are of north polarity, the south pole of the permanent magnet associated therewith is strengthened and the north pole is weakened, and vice versa. The armatures and the contacts mounted thereon are therefore caused to vibrate in synchronism with the current to be rectified, and in the system disclosed the rectifying circuits will be opened during one half wave of alternating current, closed during the succeeding half wave, and so on. Current is therefore permitted to flow only in one direction through the rectifying circuits of the devices, and consequently uni-directional current is supplied to the storage battery or other direct current translating device. Assuming that the rectifying circuits are all closed and that current tends to flow from left to right in the secondaries 4, 4', 4'', current will flow as follows:—From the secondaries 4, 4', 4'' through the conductor 6, adjustable rheostat 29, conductor 28, storage battery 27, conductor 26, then dividing into three paths, the first path being through conductor 25, armatures and contacts of rectifying device D, conductor 24, armatures and contacts of rectifying device C, conductor 23, armatures and contacts of rectifying device B, conductor 22, armatures and contacts of rectifying device A, and conductor 21 to the terminal 5 of the secondary winding 4; the second path being through conductor 25', armatures and contacts of rectifying device D', conductor 24', armatures and contacts of rectifying device C', conductor 23', armatures and contacts of rectifying device B', conductor 22', armatures and contacts of rectifying device A', and conductor 21' to the terminal 5' of the secondary winding 4'; the third path being through conductor 25'', armatures and contacts of the rectifying device D'', conductor 24'', armatures and contacts of rectifying device C'', conductor 23'', armatures and contacts of rectifying device B'', conductor 22'', armatures and contacts of rectifying device A'', and conductor 21'' to the terminal 5'' of the secondary winding 4''. This condition of affairs continues during one half wave of alternating current. During the succeeding half wave the contacts of all of the rectifying devices are opened, and no current flows through the rectifying circuits of the rectifying devices or through the direct current translating device. The circuits containing the actuating coils are not interrupted.

Instead of employing a single transformer having a plurality of secondary windings, I may employ a plurality of separate sources of alternating current operating synchronously, such as transformers, each having a single secondary winding. I have illustrated such a modification in Fig. 2, in which 4, 4' and 4'' are the secondary windings of separate transformers whose respective primary windings 30, 30', and 30" are connected across the alternating current mains 1 and 2. The secondary windings 4, 4', and 4" each have a terminal connected to the common conducting lead 6, and their other terminals 5, 5', 5" are connected to the groups of rectifying devices in the manner illustrated in Fig. 1 and hereinbefore described.

In my improved systems it will be observed that each group of rectifying devices is supplied with current from its own transformer winding, and the amount of current carried by any one group of rectifying devices is independent of the other groups. If one or more groups should carry less than their share of current, due to any cause, as for example, defective operation of one or more rectifying devices, the remaining groups of rectifying devices will not be overloaded.

The adjustable condensers 7, 7' and 7" in series with the actuating coils of the respective groups of rectifying devices are employed to advance the phase of the current in the coils in order to compensate for the inertia of the armatures and to cause the circuit to be broken at the proper times to avoid sparking. Adjustable rheostat 29 is employed to regulate the current supplied from the direct current translating device.

Having now described my invention, what I claim as new therein and desire to protect by Letters Patent is as follows:—

1. In an alternating current rectifying system, the combination of a plurality of secondary transformer windings, and a plurality of groups of serially connected rectifying devices, one of said groups being connected to each of said windings, and said groups being connected to operate in parallel, substantially as described.

2. In an alternating current rectifying system, the combination of a transformer having a plurality of secondary windings, and a plurality of rectifying devices, each of said windings having a rectifying device connected thereto, and the rectifying devices being connected to operate in parallel, substantially as described.

3. In an alternating current rectifying system, the combination of a transformer having a plurality of secondary windings, and a plurality of groups of serially connected rectifying devices, each of said secondary windings having one of said groups connected thereto, and said groups being connected to operate in parallel, substantially as described.

4. In an alternating current rectifying system, the combination of a source of alternating current, a transformer having a single primary winding connected thereto and having a plurality of secondary windings, and a plurality of rectifying devices, one of said rectifying devices being connected to each of said secondary windings, and said rectifying devices being connected to operate in parallel, substantially as described.

5. In an alternating current rectifying system, the combination of a source of alternating current, a transformer having a single primary winding connected thereto and having a plurality of secondary windings, and a plurality of groups of serially connected rectifying devices, one of said groups being connected to each of said secondary windings, and the said groups being connected to operate in parallel, substantially as described.

6. In an alternating current rectifying system, the combination of a plurality of groups of rectifying devices, each of said devices having an actuating circuit and a rectifying circuit, the rectifying circuits of each group being connected in series, and a plurality of secondary transformer windings, each of said windings being connected to the circuits of a group of rectifying devices, substantially as described.

7. In an alternating current rectifying system, the combination of a plurality of groups of rectifying devices, each of said devices having an actuating circuit and a rectifying circuit, the rectifying circuits of each group being connected in series, and a transformer having a plurality of secondary windings, each of said secondary windings being connected to the circuits of a group of rectifying devices, substantially as described.

8. In an alternating current rectifying system, the combination of a plurality of secondary transformer windings, a plurality of rectifying devices, a direct current translating device, one terminal of each of said secondary windings being connected to the direct current translating device and the other terminal being connected to a rectifying device, substantially as described.

9. In an alternating current rectifying system, the combination of a transformer having a primary winding and a plurality of secondary windings, a plurality of rectifying devices, and a direct current translating device, one terminal of each of said secondary windings being connected to the direct current translating device and the other terminal being connected to a rectifying device, substantially as described.

10. In an alternating current rectifying system, the combination of a direct current translating device, a plurality of secondary transformer windings, and a plurality of groups of rectifying devices, the rectifying devices of each group being connected in series, each of said groups being connected in series with a secondary winding, and the groups and secondary windings serially connected thereto being connected in parallel, and in series with the direct current translating device, substantially as described.

11. In an alternating current rectifying system, the combination of a direct current translating device, a transformer having a primary winding and a plurality of secondary windings, and a plurality of groups of rectifying devices, the rectifying devices of each group being connected in series, each of said groups being connected in series with a secondary winding, and the groups and secondary windings serially connected thereto being connected in parallel, and in series with the direct current translating device, substantially as described.

12. In an alternating current rectifying system, the combination of a plurality of sources of alternating current operating synchronously, and a plurality of groups of serially connected rectifying devices, one of said groups being connected to each of said sources, and said groups being connected to operate in parallel, substantially as described.

This specification signed and witnessed this 10th day of June, 1912.

THOS. A. EDISON.

Witnesses:
HENRY LANAHAN,
ANNA R. KLEHM.